United States Patent
Barkan et al.

(10) Patent No.: US 12,327,085 B2
(45) Date of Patent: *Jun. 10, 2025

(54) SENTENCE SIMILARITY SCORING USING NEURAL NETWORK DISTILLATION

(71) Applicant: Microsoft Technology Licensing, LLC, Redmond, WA (US)

(72) Inventors: Oren Barkan, Tel-Aviv (IL); Noam Razin, Herzliya (IL); Noam Koenigstein, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 373 days.

This patent is subject to a terminal disclaimer.

(21) Appl. No.: 17/844,680

(22) Filed: Jun. 20, 2022

(65) Prior Publication Data

US 2022/0318507 A1 Oct. 6, 2022

Related U.S. Application Data

(63) Continuation of application No. 16/789,385, filed on Feb. 12, 2020, now Pat. No. 11,392,770.

(60) Provisional application No. 62/946,911, filed on Dec. 11, 2019.

(51) Int. Cl.
 *G06F 40/284* (2020.01)
 *G06N 3/045* (2023.01)
 *G06N 3/08* (2023.01)

(52) U.S. Cl.
 CPC .......... *G06F 40/284* (2020.01); *G06N 3/045* (2023.01); *G06N 3/08* (2013.01)

(58) Field of Classification Search
 CPC ........ G06F 16/34; G06F 40/284; G06F 40/30; G06N 3/045; G06N 3/048; G06N 3/08
 See application file for complete search history.

(56) References Cited

U.S. PATENT DOCUMENTS

| | | | |
|---|---|---|---|
| 11,392,770 B2 * | 7/2022 | Barkan | G06F 40/30 |
| 2021/0118431 A1 * | 4/2021 | Zhang | G06F 16/93 |
| 2021/0142164 A1 * | 5/2021 | Liu | G06F 40/216 |

* cited by examiner

*Primary Examiner* — Angela A Armstrong
(74) *Attorney, Agent, or Firm* — Foley IP Law, PLLC

(57) ABSTRACT

The disclosure herein describes a system and method for attentive sentence similarity scoring. A distilled sentence embedding (DSE) language model is trained by decoupling a transformer language model using knowledge distillation. The trained DSE language model calculates sentence embeddings for a plurality of candidate sentences for sentence similarity comparisons. An embedding component associated with the trained DSE language model generates a plurality of candidate sentence representations representing each candidate sentence in the plurality of candidate sentences which are stored for use in analyzing input sentences associated with queries or searches. A representation is created for the selected sentence. This selected sentence representation is used with the plurality of candidate sentence representations to create a similarity score for each candidate sentence-selected sentence pair. A retrieval component identifies a set of similar sentences from the plurality of candidate sentences responsive to the input query based on the set of similarity scores.

20 Claims, 9 Drawing Sheets

| Model | Speedup Factor | Time | Max batch size | Time / Max batch size |
|---|---|---|---|---|
| BERT-Large | 1 | 9.66 hr | 300 | 10.43s |
| DSE ($\psi$ phase) | - | 34.73s | 300 | 10.43s |
| DSE ($f$ phase) | - | 2.48s | 200k | 0.49s |
| DSE | 934 | 37.21s | - | - |

FIG. 8

| Model | Speedup Factor | Time |
|---|---|---|
| BERT-Large | 1 | 58m |
| DSE ($\psi$ phase) | - | 0.052s |
| DSE ($f$ phase) | - | 0.204s |
| DSE | 13594 | 0.256s |

FIG. 9

SENTENCE SIMILARITY SCORING USING NEURAL NETWORK DISTILLATION

CROSS-REFERENCE TO RELATED APPLICATION

This application is a continuation application of and claims priority to U.S. patent application Ser. No. 16/789,385, entitled "SENTENCE SIMILARITY SCORING USING NEURAL NETWORK DISTILLATION," filed on Feb. 12, 2020, which claims priority to U.S. Provisional Patent Application No. 62/946,911, entitled "SENTENCE SIMILARITY SCORING USING NEURAL NETWORK DISTILLATION," filed on Dec. 11, 2019, the disclosures of which are incorporated herein by reference in their entireties.

BACKGROUND

Language models are frequently used to perform various linguistic tasks such as machine translation, sentiment analysis, question answering and sentence similarity. Many of these language models utilize scoring of sentence-pairs involving a cross-attention (CA) operation in which each word in a sentence A attends to all words in a sentence B and vice versa, excluding the fact that each word attends to all other words in the same sentence as well. In some language models, CA is applied in a cascade throughout a stack of multi-head attention layers to compute similarity between sentence pairs by analyzing the relations between individual words. However, this entails an excessively demanding inference phase which is time-consuming and computationally expensive. This can create a computational bottleneck. Moreover, CA models are typically not trained to produce sentence embeddings with respect to the task at hand resulting in additional computational inefficiency.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some examples provide a system and method for training a distilled sentence embedding (DSE) language model by decoupling a transformer language model using knowledge distillation to calculate sentence embeddings for a plurality of candidate sentences. A plurality of candidate sentence representations are precomputed by the trained DSE language model and stored in a data storage device. A set of similarity scores are generated for each candidate sentence in the plurality of candidate sentences and a selected sentence associated with an input query based on a representation of the selected sentence and a representation of each candidate sentence in the plurality of candidate sentences. The set of similarity scores includes a similarity score for each candidate sentence compared with the selected sentence. A set of similar sentences are selected from the plurality of candidate sentences based on the set of similarity scores. A response to the input query is generated. The response includes the selected set of similar sentences.

BRIEF DESCRIPTION OF THE DRAWINGS

The disclosed examples are described in detail below with reference to the accompanying drawing figures listed below:

FIG. 8 is an exemplary table illustrating time comparisons between the DSE model and the trained transformer language model performing similarity computation between sentence pairs with a catalog of one thousand candidate sentences.

FIG. 9 is an exemplary table illustrating time comparisons between the DSE model and the trained transformer language model performing similarity determination between a query and a catalog of one hundred thousand candidate sentences.

Corresponding reference characters indicate corresponding parts throughout the drawings.

DETAILED DESCRIPTION

Figure 1:
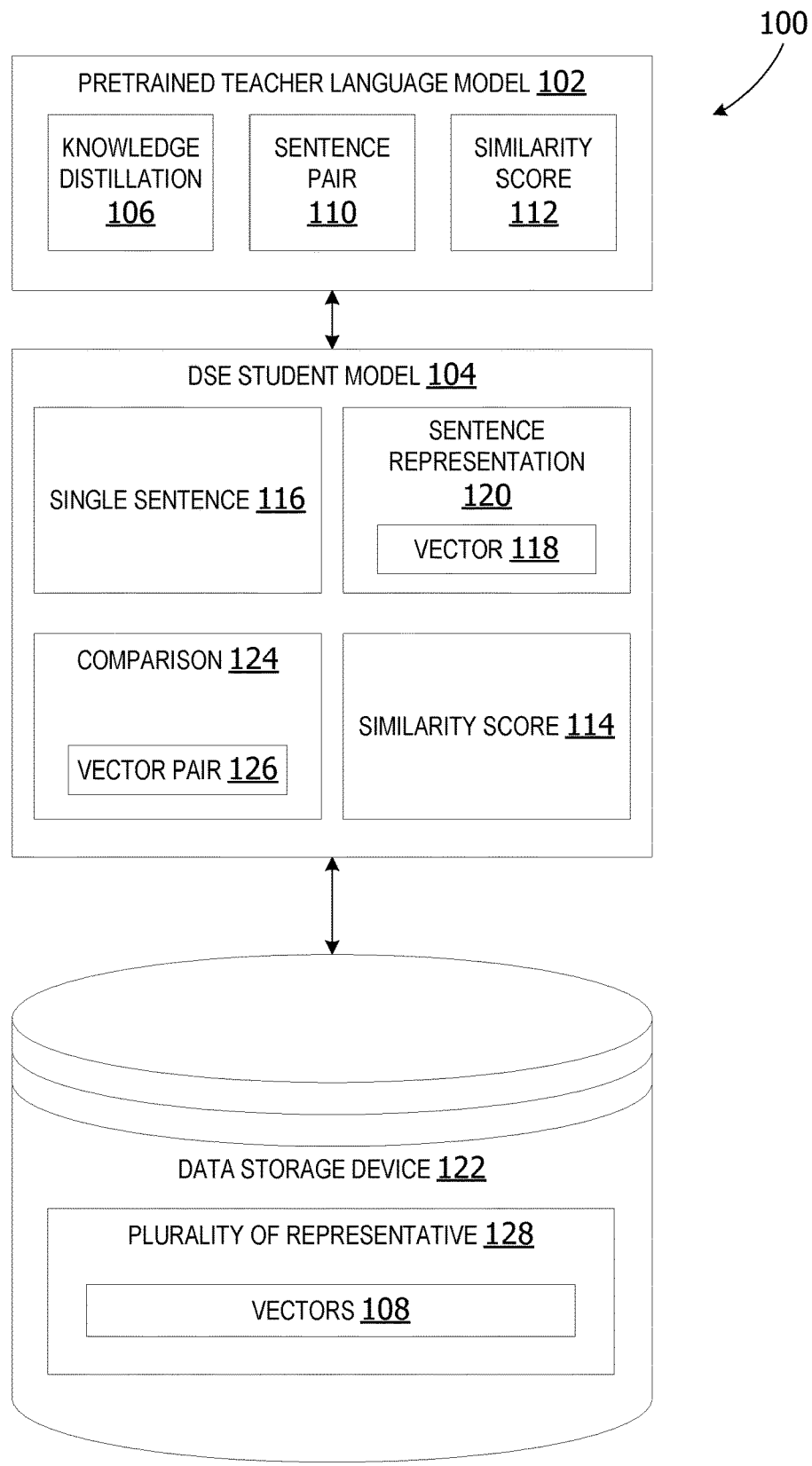
FIG. 1 is an exemplary block diagram illustrating a system 100 for text-based similarity scoring using knowledge distillation from a teacher model to a student model.

The emergence of self-attentive models, such as the transformer language model, generative pre-training (GPT) models, bidirectional encoder representations from transformers (BERT) model, XLNet and other natural language processing (NLP) models significantly advanced the state-of-the-art in various linguistic tasks such as machine translation, sentiment analysis, question answering and sentence similarity. These models are built upon a stack of self-attention layers that enable each word to attend other words in a sentence.

In the latest models, such as BERT and XLNet, self-attention is applied in a bidirectional manner. This is different from conventional language models, in which each word in a sentence is conditioned solely on its preceding words. In addition, the architectures in support sentence-pair input, endow these models with the ability to infer sentence similarity. However, this capability entails a non-negligible computational cost. Moreover, CA is repeatedly applied in a cascade throughout a stack of multi-head attention layers. This CA entanglement is a double-edged sword. On the one hand, it computes similarity between sentence pairs by analyzing the relations between individual words $a \in A$ and $b \in B$. On the other hand, it entails an excessively demanding inference phase in terms of time and computational power. Where a CA model T and a set of candidates X that contains N sentences, the task for the language model is to retrieve the topmost similar sentences in X with regard to a new query sentence q. A naïve solution is to compute the similarity between each sentence x∈X and q, which amounts to N applications of T (scoring each sentence-pair (q, x) using T). In other words, the propagation of the entire candidates set X through T is necessary to produce the similarity scores with respect to a single query q.

A second problem with CA models is the fact that they are not trained to produce sentence embeddings with respect to the task at hand. While several types of heuristics can be employed to produce sentence embedding (e.g., summing the several last hidden token representations, using the CLS hidden token as a sentence representation, etc.), none of them are truly justified. These operations are employed after the training phase is over and are not directly related to the original training objective. This problem is a key differentiator between CA models and other models that inherently support sentence embedding.

Aspects of the disclosure provide scalable attentive sentence similarity scoring using neural network distillation to decouple a transformer language model and generate a trained sentence embedding model. Decoupling refers to decoupling the sentence embedding from the similarity function analysis. Candidate sentence embedding is performed to precompute candidate sentence representations prior to receiving a query. Each sentence is processed independently rather than as a sentence pair to improve processing speed and reduce resource usage.

In other examples, the similarity scoring is performed by a distilled sentence embedding (DSE) model for computing sentence similarity comparisons based on sentence representations. This enables improved sentence similarity comparisons that reduces processing time and reduces processor resource usage.

FIG. 1 is an exemplary block diagram illustrating a system for text-based similarity scoring using knowledge distillation from a teacher model to a student model. The system 100 in some examples includes a pretrained teacher language model 102. The pretrained teacher language model 102 is a general language model or an unsupervised pretrained language model. The pretrained teacher language model 102 can include, without limitation, a BERT language model, ELMo deep contextualized word representations model, XLNET, ALBERT or any other natural language processing (NLP) transformer-type of language model. The pretrained teacher language model 102 is utilized to train a distilled sentence embedding (DSE) student model 104.

The pretrained teacher language model 102 and/or the DSE student model 104 executes on a computing device or a cloud server. The computing device can include any device executing computer-executable instructions (e.g., as application programs, operating system functionality, or both) to implement the operations and functionality associated with the untrained language model 102, such as, but not limited to, the computing device 1000 in FIG. 10 below. The computing device can be implemented as a mobile computing device or any other portable device. The computing device can also include less-portable devices such as servers, desktop personal computers, kiosks, or tabletop devices. Additionally, the computing device can represent a group of processing units or other computing devices. In some examples, the computing device has at least one processor and a memory.

The pretrained teacher language model 102 and/or the DSE student model 104 can also be implemented on a cloud server. A cloud server may be a logical server providing services to one or more computing devices or other clients. A cloud server may be hosted and/or delivered via a network for enabling communications with remote computing devices, such as, but not limited to, a local area network (LAN), a subnet, a wide area network (WAN), a wireless (Wi-Fi) network, the Internet or any other type of network. A cloud server can be implemented on one or more physical servers in one or more data centers. In other examples, the cloud server may be associated with a distributed network of servers.

The DSE student model is a deep learning, machine learning language model for learning a sentence embedding via knowledge distillation 106 from CA models. The pretrained teacher language model 102 is a trained CA teacher model. The DSE student model 104 is being trained by the pretrained teacher language model 102 in some examples.

The DSE student model is trained to map sentences to a set of feature vectors 108 in a latent space, in which the application of a low-cost similarity function approximates the similarity score obtained by the pretrained teacher language model 102 for the corresponding sentence pair 110. Specifically, the DSE student model 104 employs a pairwise training procedure in which each pair of sentences (A, B) and pretrained teacher language model 102 similarity score (TAB) 112 (that is obtained by the teacher model for the specific sentence-pair) is treated as a training example.

The DSE student model 104 consists of parametric embedding and similarity functions. The embedding function maps the sentence A and the sentence B to one or more vectors, on which the similarity function is applied to produce a student model similarity score (SAB) 114. The embedding function maps a single sentence 116 to a vector 118 to create or precompute a sentence representation 120 for each sentence. The precomputed vectors 108 are stored in a data store, such as, but not limited to, the data storage device 122.

The data storage device 122 can include one or more different types of data storage devices, such as, for example, one or more rotating disks drives, one or more solid state drives (SSDs), and/or any other type of data storage device. The data storage device 122 in some non-limiting examples includes a redundant array of independent disks (RAID) array. In other examples, the data storage device 122 includes a database.

The data storage device 122 in some examples is included within a computing device, such as, but not limited to, the computing device 1000 in FIG. 10 below. In other examples, the data storage device 122 is attached to the computing device, plugged into the computing device or otherwise associated with the computing device. In yet other examples, the data storage device 122 includes a remote data storage accessed by the computing device via a network, such as a remote data storage device, a data storage in a remote data center, or a cloud storage.

The network may be implemented by one or more physical network components, such as, but without limitation, routers, switches, network interface cards (NICs), and other network devices. The network is any type of network for enabling communications with remote computing devices, such as, but not limited to, a local area network (LAN), a subnet, a wide area network (WAN), a wireless (Wi-Fi) network, or any other type of network. In this example, the network is a WAN, such as the Internet. However, in other examples, the network is a local or private LAN.

The DSE student model in some examples applies a loss function to make a comparison 124 between the training model similarity score (SAB) score and the training model similarity score (TAB). This provides a feedback loop which is used to determine whether training of the DSE student model is completed sufficiently. If the scores generated by the DSE student model vary from the scores generated by the teacher model, the training of the student model continues.

During the training phase, the DSE student model parameters (including the embedding and similarity functions) are learned via stochastic gradient descent with respect to a loss function that compares the student output score SAB to the teacher model score TAB.

In the inference phase, the student model maps an input sentence-pair, such as, but not limited to, the sentence pair 110, to a vector-pair using the embedding function. The DSE student model 104 computes the vector-pair similarity score 114 using the similarity function. In this manner, the DSE student model 104 performs a disentanglement that enables the precomputation of the candidate sentence embeddings in advance. As a result, for ranking and retrieval tasks, the computational complexity of a query reduces to a single application of the student DSE model to the query sentence q, followed by N applications of the low-cost similarity function (for each vector-pair).

In some examples, the DSE student model 104 precomputes a representation for each candidate sentence in the plurality of candidate sentences being compared (for comparison) with the selected (primary) sentence. If there are ten candidate sentences, the DSE student model 104 performs an embedding function on each of the sentences to generate ten sentence representations. Each of the precomputed candidate sentence representations in a plurality of representations 128 associated with the plurality of candidate sentences are stored in a data store, such as the data storage device 122.

When the DSE student model 104 receives a new input query sentence, the DSE student model converts the sentence to a selected sentence representation for comparison with the representation of each candidate sentence stored in the plurality of representations 128 in a database (table) or other data store on the data storage device 122.

Figure 2:
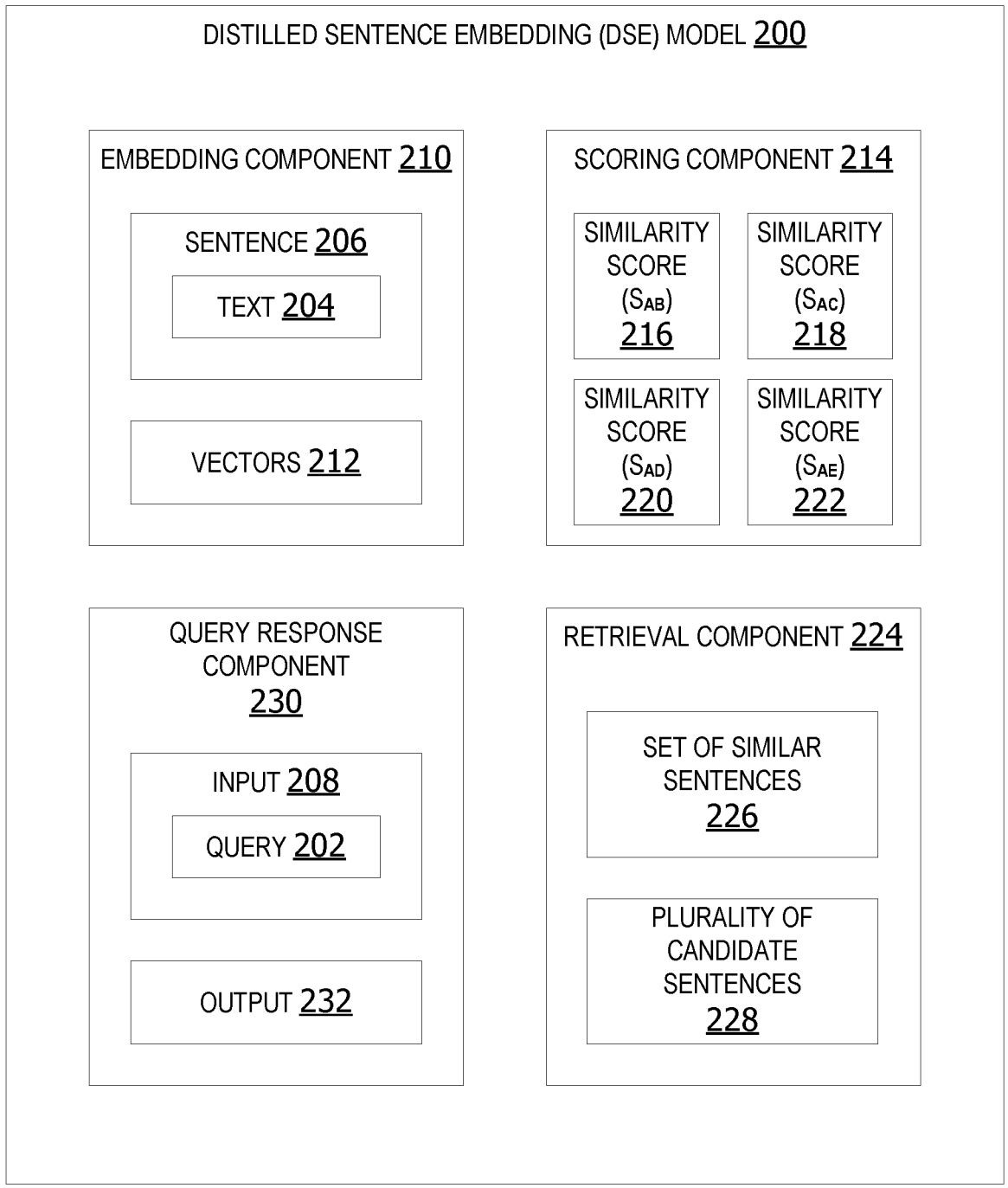
FIG. 2 is an exemplary block diagram illustrating a distilled sentence embedding (DSE) model 200 for generating similarity scores.

FIG. 2 is an exemplary block diagram illustrating a trained DSE model 200 for generating similarity scores. The DSE model 200 is a trained language model for performing sentence similarity comparisons between a selected primary sentence and two or more candidate sentences. The DSE model 200 is a model such as, but not limited to, the DSE student model 104 after training of the model is completed.

In some examples, the DSE model 200 receives a query 202 including text 204, such as in the form of a sentence 206 input 208 by a user or other entity, such as an application. The query 202 may be referred to as an input query.

The query 202 in some examples is a request including a sentence which is to be compared to one or more candidate sentences. A candidate sentence can include, for example, a pre-generated or pre-prepared response sentences. In some examples, a query is a question or search term. The candidate sentences are sentences responsive to the question or sentences including information matching the search term(s) in the query. In still other examples, the query is a frequently asked question, a search parameter, or other information request.

An embedding component 210 performs an embedding function on the sentence 206 to map the sentence 206 to a set of one or more vectors 212, such as, but not limited to, a feature vector. Embedding refers to creating a representation of the sentence 206. The representation in some non-limiting examples is a numerical value. The trained DSE model in this example is trained to create high-quality sentence embeddings.

A scoring component 214 in some examples performs a comparison function on the selected sentence 206 representation with the representation of each of the candidate sentences in turn to generate a similarity score for each pair of sentences. For example, when an input sentence A is received, if there are four candidate sentences B, C, D and E, the scoring component generates four similarity scores ranking the similarity of the input sentence with each of the four candidate sentences. In this example, the scoring component 214 creates a similarity score 216 for the sentence A compared with the candidate sentence B, a similarity score 218 for the sentence A and the sentence C, a similarity score 220 for the sentence A and the candidate sentence D, and another similarity score for the sentence A compared with the candidate sentence E.

A retrieval component 224 retrieves a set of one or more similar sentences 226 from the plurality of candidate sentences 228 having the highest similarity scores indicating candidate sentences which are the top "K" matching or similar sentences as compared with the selected sentence 206.

Figure 3:
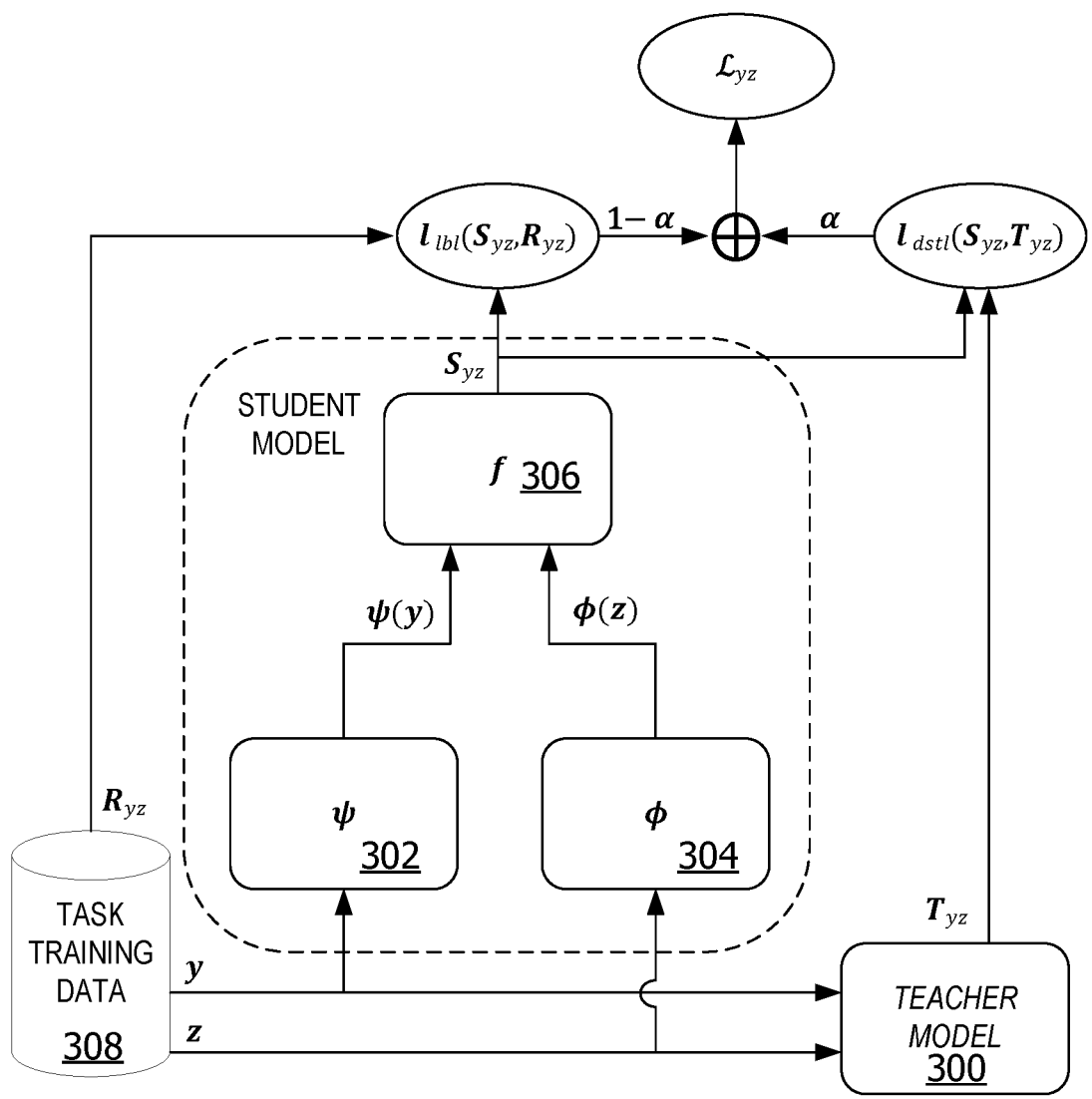
FIG. 3 is an exemplary block diagram illustrating training of a DSE model via knowledge distillation from a pretrained teacher language model.

FIG. 3 is an exemplary block diagram illustrating training of a DSE model via knowledge distillation from a pretrained teacher language model. The DSE model is a model for performing sentence similarity comparisons, such as, but not limited to, the DSE student model 104 in FIG. 1 and/or the DSE language model 200 in FIG. 2.

In some examples, the vocabulary $\mathcal{W} = \{w_i\}_{i=1}^{w}$ represents the vocabulary of all supported tokens. The term Y is defined to be the set of all possible sentences that can be generated using the vocabulary $\mathcal{W}$. The teacher model 300 T: $Y \times Y \to \mathbb{R}$ in some examples can be a fine-tuned BERT language model. The teacher language "T" receives a sentence-pair (y, z)∈Y×Y and outputs a similarity score $T_{yz} \triangleq T(y, z)$. In some examples, T is not necessarily a symmetric function.

In some examples, $\psi$, $\phi$: $Y \to \mathbb{R}^d$ represents sentence embedding functions that embed a sentence y∈Y in a d-dimensional latent vector space. The usage of different sentence embedding functions, embedding function $\psi$ 302 and embedding function $\phi$ 304, is due to the fact that T is not necessarily a symmetric function. For example, in a pre-trained transformer language model, the sentences A and B are associated with different segment embeddings. Therefore, $\psi$ and $\phi$ play a similar role as the common context and target representations that appear in many neural embedding methods.

Where $f$: $\mathbb{R}^d \times \mathbb{R}^d \to \mathbb{R}$ is a (parametric) similarity function, the $f$ 306 scores the similarity between sentence embeddings that are produced by $\psi$ 302 and $\phi$ 306. Then, the student model S: $Y \times Y \to \mathbb{R}$ is defined as $$S_{yz} \triangleq f(\psi(y), \phi(z)). \quad (1)$$

Given a set of paired training sentences $X = \{y_i, z_i\}_{i=1}^{N}$, the student DSE model S is trained such that for all (y, z)∈X, its similarity score $S_{yz}$ approximates the teacher language model's score $T_{yz}$ with a high accuracy. The student model learns the parameters via a pairwise training procedure, explained below. In some sentence-pair tasks, the pretrained transformer teacher model's codomain is multidimensional. For example, the MNLI task is to predict whether the relation between two sentences is neutral, contradictory or entailment. In this case, the codomain of the teacher model T is $\mathbb{R}^3$ and hence the codomain of the similarity function $f$ (and the student model S) is $\mathbb{R}^3$ as well.

In pairwise training, a loss function $\mathcal{L}: \mathbb{R} \times \mathbb{R} \to \mathbb{R}$ is defined and the student model S is trained to minimize $\mathcal{L}(S_{yz}, T_{yz})$ in an end-to-end fashion. Specifically, given a sentence-pair $(y, z) \in X \times X$, we compute the embeddings $\psi(y)$ and $\phi(z)$ for the sentences y and z, respectively. Then, the similarity score $S_{yz}$ is computed using the similarity function $f$ according to Eq. (1).

The $\mathcal{L}$ can be either a regression or classification loss depending on the task at hand. Moreover, $\mathcal{L}$ can be trivially extended to support multiple teacher models. In some examples, two teacher models T and R are used, where R is simply the ground truth labels as follows:

$$\mathcal{L}_{yz} = \alpha l_{dstl}(S_{yz}, T_{yz}) + (1-\alpha) l_{lbl}(S_{yz}, R_{yz}) \quad (2)$$

where $\alpha \in [0,1]$ is a hyperparameter that controls the relative amount of supervision that is induced by T and R. In this case, the student model is simultaneously supervised by T and R. In general, the distillation loss $l_{dstl}$ and the ground truth label loss $l_{lbl}$ are not restricted to be the same loss function.

The teacher model T 300 in some examples is implemented as a BERT-Large model, consisting of twenty-four encoder layers that each employ a self-attention mechanism. For a sentence-pair input, T employs CA between the two sentences. The teacher model 300 is a teacher language model. The teacher language model is initialized to the pre-trained version and then fine-tuned according to each specific sentence-pair task. In some examples, training and/or fine-tuning is performed using task training data 308 retrieved from a data store, such as, but not limited to, the data storage device 122 in FIG. 1.

After the fine-tuning phase, the score $T_{yz}$ is computed for a sentence-pair (y, z) by propagating a unified representation of the sentence-pair throughout T. The score is then extracted from the output layer, which is placed on top of the last hidden representation of the CLS token. In some examples, $T_{yz}$ is set to the logit value before the softmax function/sigmoid activation. The softmax function is a mathematical function which may also be referred to as softargmax or normalized exponential function.

In some examples, the teacher model 300 is based on BERT, which is not symmetric due to its use of different segment embeddings for input sentences. However, the examples are not limited to BERT as a teacher model. For example, the teacher model 300 can also be implemented with XLNet or any other pretrained transformer language model teacher.

In other examples, to refrain from doubling the number of parameters, the system utilizes a symmetric student model by learning a single mutual embedding function $\psi (=\phi)$. The embedding function $\psi$ 302 is implemented using a BERT-Large model that operates on a single sentence (using only the segment embedding A) and outputs a vector representation. Specifically, given a sentence y, the CLS token is added to the beginning of y and a SEP token to the end, before feeding the embedding function with the resulted representation. Then, the model computes the average pooling operation across the hidden tokens for each of the last four encoder layers' outputs Degradations in performance can be observed when including the CLS token in the pooling of hidden tokens, thus, in some examples, it is excluded from it. This is due to the fact that during pre-training the CLS token representation is used for encoding information across two sentences for the next sentence prediction task and may not be suitable in some example for representing a single sentence. The pooling operation produces four 1024-dimensional vectors (one for each encoder layer) that are then concatenated to form a 4096-dimensional representation as the final sentence embedding (hence d=4096).

The similarity function:

$$f(u, v) = w^T \text{ReLU}(Wh) \quad (3)$$

can be used where $h=[u, v, u \circ v, |u-v|] \in \mathbb{R}^{16384}$ ($\circ$ stands for the Hadamard product), $W \in \mathbb{R}^{512 \times 16364}$ and $w \in \mathbb{R}^{512}$. Both W and w are learnable parameters. In other examples, $u, v \in \mathbb{R}^{4069}$ are the sentences' representations that are produced by the embedding function $\psi$. Like the teacher model, $\psi$ is initialized to the pre-trained version of BERT-Large language model.

In other examples, a loss function includes a linear combination of the distillation and label losses. The distillation loss term is set to the L2 loss as follows:

$$l_{dstl}(S_{yz}, T_{yz}) = l_{L2}(S_{yz}, T_{yz}) = \|S_{yz} - T_{yz}\|_2^2.$$

where high temperature values and minimization of the cross-entropy loss over the softmax outputs, is equivalent to minimizing L2 loss over the logits before applying the softmax function. Using the L2 loss on the logits produces superior distillation results. The label loss is set according to the task at hand. For a multiclass classification task, the label loss is set as follows:

$$l_{lbl}(S_{yz}, R_{yz}) = l_{cce}(\rho(S_{yz}), R_{yz})$$

where $R_{yz} \in \{0,1\}^n$ is a one-hot vector, $\rho(S_{yz}) \in [0,1]^n$ is a discrete probability distribution obtained by applying the softmax function $\rho$, and $l_{cce}(a, b) = -\Sigma_{i=1}^n b_i \log a_i$ is the categorical cross entropy loss. For a binary classification task, the same loss is used with n=2. For a regression task, in some examples, the language model sets $l_{lbl}(S_{yz}, R_{yz}) = l_{L2}(S_{yz}, R_{yz})$, where $R_{yz} \in \mathbb{R}$.

Figure 4:
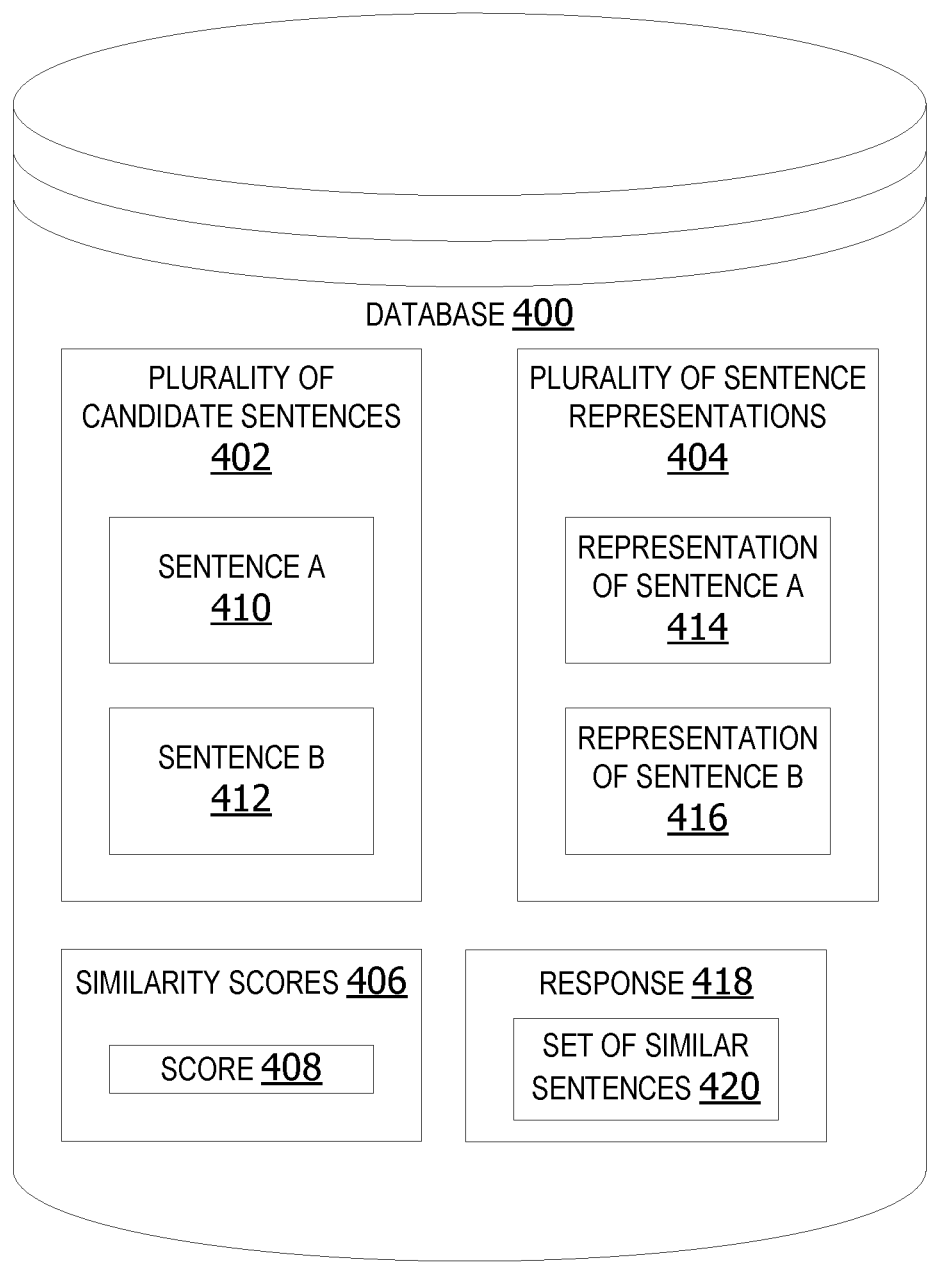
FIG. 4 is an exemplary block diagram illustrating a database 400 storing precomputed candidate sentence representations.

FIG. 4 is an exemplary block diagram illustrating a database storing precomputed candidate sentence representations. The database 400 represents any type of database or other data store for storing organized collections of data, such as, but not limited to, a relational database. The database 400 can be implemented on one or more data storage devices, such as, but not limited to, the data storage device 122 in FIG. 1.

In some examples, the database 400 stores a plurality of candidate sentences 402, a plurality of sentence representations 404 and/or a plurality of training similarity scores 406, such as, but not limited to, a similarity score 408 generated by a pretrained teacher transformer model.

The plurality of candidate sentences 402 includes a set of one or more similar sentences 420 which may be output in response 418 to a query, such as, but not limited to, a sentence A 410 and/or the sentence B 412. The plurality of sentence representations can include, for example but without limitation, a representation of sentence A 414 and/or a representation of sentence B 416.

Figure 5:
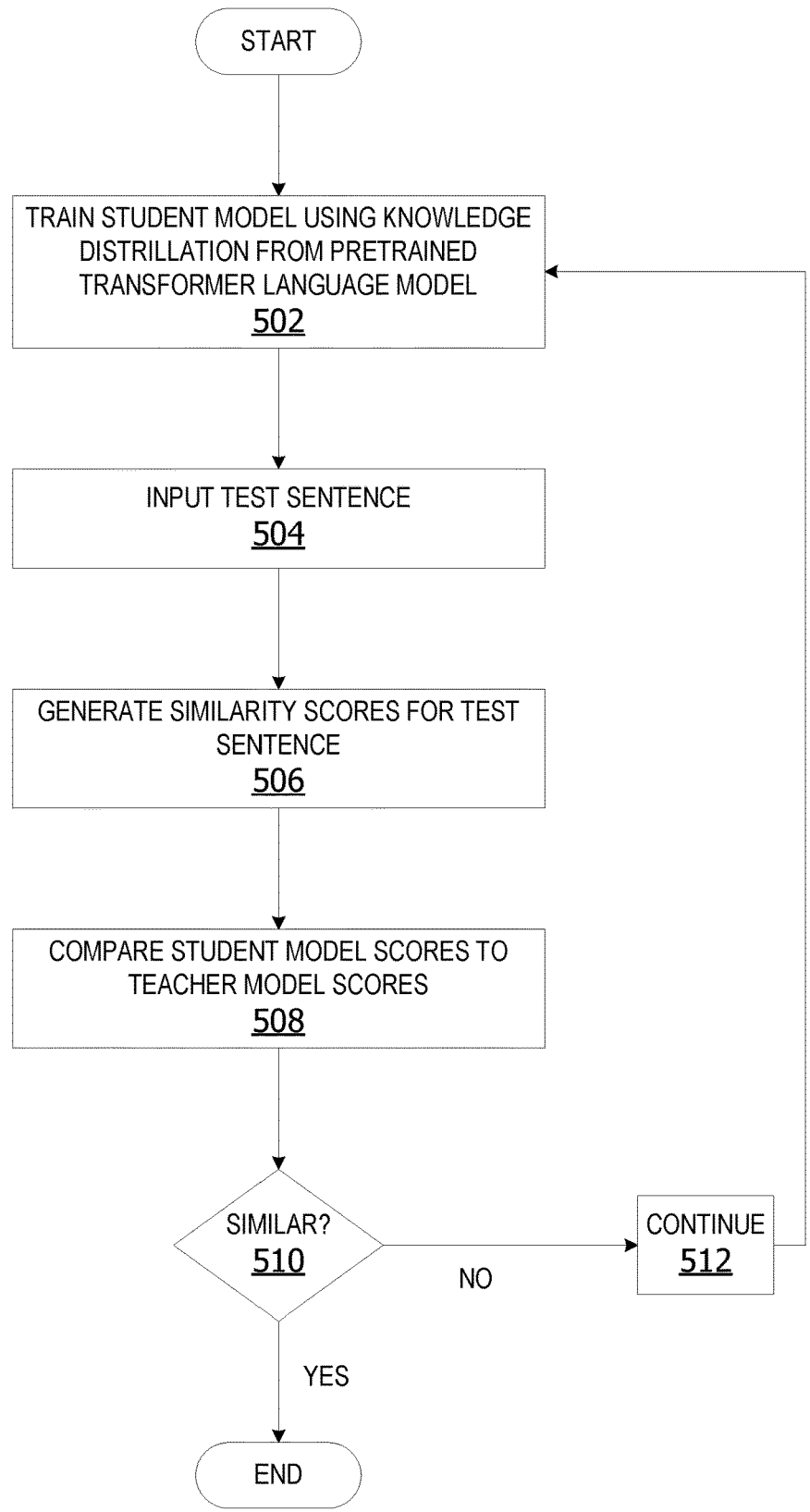
FIG. 5 is an exemplary flow chart illustrating operation of the computing device to train a DSE language model by a pretrained teacher language model.

FIG. 5 is an exemplary flow chart illustrating operation of the computing device to train a DSE language model by a pretrained teacher language model. The process shown in FIG. 5 is performed by a language model, executing on a computing device, such as the computing device 1000 of FIG. 10.

The process begins by training a student model using a knowledge distillation from pretrained transformer language model at 502. The pretrained transformer language model is a teacher language model pretrained for performing sentence similarity comparisons, such as, but not limited to, the pretrained teacher language model 102 in FIG. 1.

A test sentence is input into the student language model at 504. The test sentence is a single sentence. The student language model generates similarity scores at 506. The similarity scores include one or more scores which rank or score the test sentence paired with each candidate sentence in a plurality of candidate sentences using the representations of the test sentence and the candidate sentences, such as, but not limited to, the similarity score 112 in FIG. 1. The student model similarity score(s) are compared to the teacher model similarity scores at 508. A determination is made as to whether the scores are similar at 510. If no, training of the student language model continues at 512. The process executes operations 502 through 510 until the student model is trained such that it generates similarity scores which are the same or similar to the scores generated by the teacher model for the same sentence pairs. The process terminates thereafter.

While the operations illustrated in FIG. 5 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 5.

Figure 6:
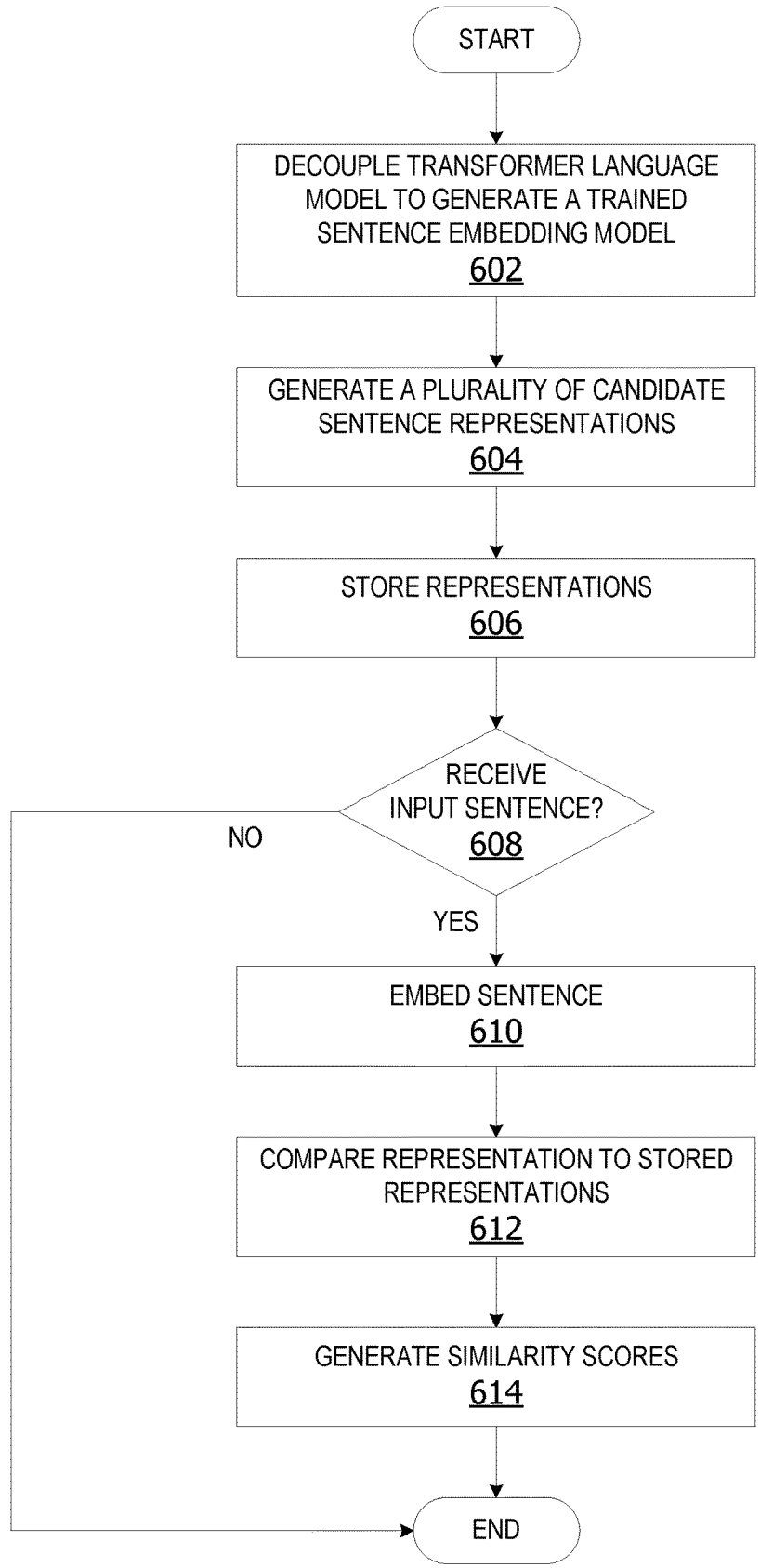
FIG. 6 is an exemplary flow chart illustrating operation of the computing device to perform precomputation of candidate sentence embedding.

FIG. 6 is an exemplary flow chart illustrating operation of the computing device to perform precomputation of candidate sentence embedding. The process shown in FIG. 6 is performed by a language model, executing on a computing device, such as the computing device 1000 of FIG. 10.

The process begins by decoupling a transformer language model to generate a trained DSE model at 602. The DSE model is a sentence embedding model for mapping sentences to feature vectors to generate representations of sentences, such as, but not limited to, the DSE model 200 in FIG. 2. The DSE model generates a plurality of candidate sentence representations at 604. A representation in the plurality of representations is a vector or other representation of a sentence, such as, but not limited to, the sentence representation 120 in FIG. 1. The representations are stored at 606. The representations can be stored in a database or other data store, such as, but not limited to, the database 400 in FIG. 4. A determination is made as to whether an input sentence is received at 608. The input sentence in some examples is a query entered by a user. If the input sentence is received, the DSE model embeds the sentence at 610. Embedding the sentence refers to converting the input sentence into a representation. The model compares the representation of the input sentence (primary sentence) to the stored representations for each candidate sentence at 612. The DSE model generates similarity scores at 614. Each score in the set of similarity scores indicates the similarity of the input sentence with a given candidate sentence. The process terminates thereafter.

While the operations illustrated in FIG. 6 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 6.

Figure 7:
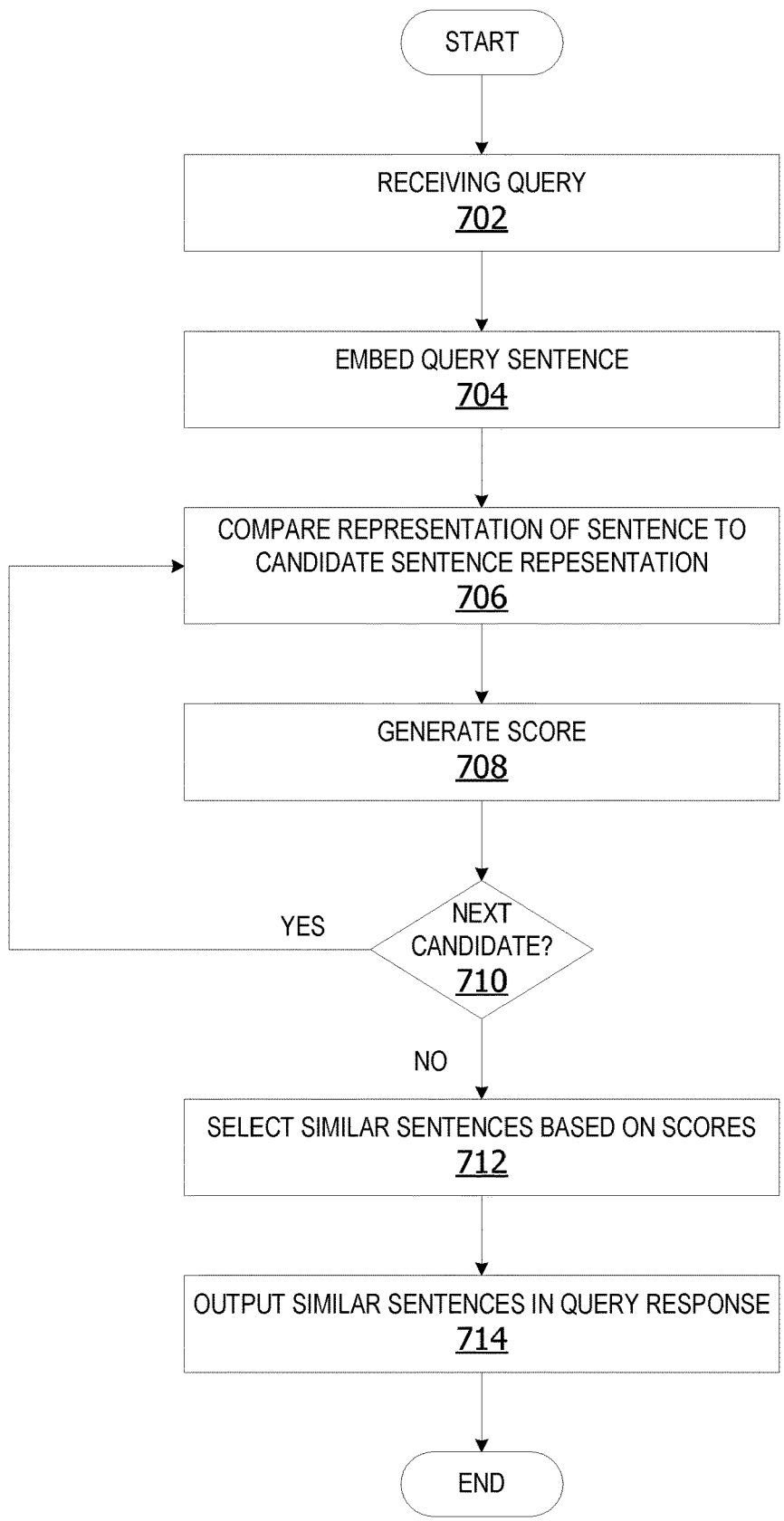
FIG. 7 is an exemplary flow chart illustrating operation of the computing device to perform sentence pair similarity computation by a DSE model trained via knowledge distillation from a pretrained transformer language model.

FIG. 7 is an exemplary flow chart illustrating operation of the computing device to perform sentence pair similarity computation by a DSE model trained via knowledge distillation from a pretrained transformer language model. The process shown in FIG. 7 is performed by a language model, executing on a computing device, such as the computing device 1000 of FIG. 10.

The process begins by receiving a query at 702. The query includes at least one sentence for similarity comparison with two or more candidate sentences, such as, but not limited to, the query 202 in FIG. 2. The DSE language model embeds the sentence in the query at 704. The DSE language model compares the representation of the input sentence to candidate sentence representations at 706. The DSE language model generates a score at 708. The score indicates the similarity between the query sentence and a selected candidate sentence. A determination is made as to whether there is a next candidate sentence in the plurality of candidate sentences for similarity comparison with the input query sentence at 710. If yes, the DSE model iteratively compares each candidate sentence representation to the representation of the query sentence until the query sentence has been compared to all the candidate sentences at 710. The DSE language model selects similar sentences based on the scores at 712. The system outputs sentences similar to the query sentence in a query response at 714. The query response is a response such as, but not limited to the response 418 in FIG. 4. The process terminates thereafter.

FIG. 8 is an exemplary table 800 illustrating time comparisons between the DSE model and the trained transformer language model performing similarity computation between sentence pairs with a catalog of one thousand candidate sentences. The table 800 shows time comparisons between the DSE language model and the pretrained transformer language model for an offline computation of one thousand sentence-pairs similarities for a set of one thousand candidate sentences. In this example, the DSE language model generates a similarity score for each combination of a selected (primary) sentence and each of the candidate sentences for a total of one thousand similarity scores. The DSE language model completes the computations in less time and/or with improved efficiency over the pretrained transformer language model which computes similarity for sentence pairs including the selected sentence with each of the candidate sentences.

FIG. 9 is an exemplary table 900 illustrating time comparisons between the DSE model and the trained transformer language model performing similarity determination between a query and a catalog of one hundred thousand candidate sentences. The table 900 illustrates the computational time differences between the DSE language model and the pretrained transformer language model for an online computation of sentence similarities between a query sentence and a set of one hundred thousand sentences.

The computational time indicates the amount of time used by each model for computing sentence similarities for a selected (primary) sentence with each candidate sentence in a set of one hundred thousand candidate sentences. In this example, each model generates one hundred thousand similarity scores where each score represents the similarity of the selected input sentence with each candidate sentence.

Additional Examples

Some aspects and examples disclosed herein are directed to a system, method and/or computer executable instructions for attentive sentence similarity scoring comprising: a processor; and a computer-readable medium storing instructions that are operative upon execution by the processor to: train a distilled sentence embedding (DSE) language model by decoupling a transformer language model using knowledge distillation to calculate sentence embeddings for a plurality of candidate sentences; precompute a plurality of candidate sentence representations by the trained DSE language model; store the precomputed plurality of candidate sentence representations in a data storage device; generate a set of similarity scores for each candidate sentence in the plurality of candidate sentences and a selected sentence associated with an input query based on a representation of the selected sentence and a representation of each candidate sentence in the plurality of candidate sentences, the set of similarity scores comprising at least one similarity score for each candidate sentence compared with the selected sentence; select a set of similar sentences from the plurality of candidate sentences based on the set of similarity scores; and output, via a user interface device, the set of similar sentences associated with a query response.

Additional aspects and examples disclosed herein are directed to a system, method or computer executable instructions for training a distilled sentence embedding (DSE) language model by decoupling a transformer language model using knowledge distillation to calculate sentence embeddings for a plurality of candidate sentences; precomputing a plurality of candidate sentence representations by the trained DSE language model; storing the precomputed plurality of candidate sentence representations in a data storage device; generating a set of similarity scores for each candidate sentence in the plurality of candidate sentences and a selected sentence associated with an input query based on a representation of the selected sentence and a representation of each candidate sentence in the plurality of candidate sentences, the set of similarity scores comprising at least one similarity score for each candidate sentence compared with the selected sentence; selecting a set of similar sentences from the plurality of candidate sentences based on the set of similarity scores; and outputting, via a user interface, the set of similar sentences associated with a query response.

Additional aspects and examples disclosed herein are directed to a system, method and/or one or more computer storage devices having computer-executable instructions stored thereon for attentive sentence similarity scoring, which, on execution by a computer, cause the computer to perform operations comprising: training a distilled sentence embedding (DSE) language model by decoupling a transformer language model using knowledge distillation to calculate sentence embeddings for a plurality of candidate sentences; precomputing a plurality of candidate sentence representations by the trained DSE language model; storing the precomputed plurality of candidate sentence representations in a data storage device; generating a set of similarity scores for each candidate sentence in the plurality of candidate sentences and a selected sentence associated with an input query based on a representation of the selected sentence and a representation of each candidate sentence in the plurality of candidate sentences, the set of similarity scores comprising at least one similarity score for each candidate sentence compared with the selected sentence; selecting a set of similar sentences from the plurality of candidate sentences based on the set of similarity scores; and outputting the set of similar sentences associated with a query response.

Other examples provide a decoupled sentence similarity model providing fast text-based similarity scoring. The DSE model provides acceleration of the latest transformer-based models for fast sentence similarity computation using a knowledge distillation method to decouple the sentence embedding function from the similarity scoring function of the language model.

The system, in other examples, provides a method of training a neural network for comparing the similarities between a primary sentence and several candidate sentences. The DSE model provides a lightweight function that does not have the processing cost of comparing every word of the primary sentence to each word of the candidate sentences (cross-attention). This is achieved by training a student model from a fully trained cross-attention operation that can then distill sentences down to candidate vectors that are then more quickly compared. Due to pre-computation of the candidate sentence vectors, newly received query sentences only requires simple calculation comparing sentence vectors permits the model to retrieve results more quickly than the pretrained transformer language models.

In still other examples, the system de-couples a transformer language model (making it into a sentence embedding model). Instead of inputting two sentences together into the transformer language model for similarity computation together, a single input sentence is provided to the DSE model for extraction and embedding to create a representation for that sentence. The DSE model then compares the representation of the input sentence with pre-generated representations of candidate sentences and calculate a similarity score for each input sentence and candidate sentence pair.

Alternatively, or in addition to the other examples described herein, examples include any combination of the following:

a transformer language model, wherein the DSE language model is trained by decoupling the transformer language model to perform sentence similarity comparisons using knowledge distillation;

perform a comparison function, by the scoring component, on the selected sentence representation and a representation of a selected candidate sentence to generate a similarity score for the selected candidate sentence and the selected sentence;

a user interface device, wherein the response is output to at least one user via the user interface device;

a student language model, wherein the student language model is trained by comparing test similarity scores ranking a test sentence paired with each candidate sentence in the plurality of candidate sentences with training similarity scores generated by a trained teacher model to determine whether to continue training the student language model;

the trained DSE language model maps the selected sentence to a set of vectors in latent space to generate a representation of the selected sentence for comparison with the plurality of candidate sentence representations; and wherein the trained DSE language model calculates sentence embeddings for a plurality of candidate sentences.

While the aspects of the disclosure have been described in terms of various examples with their associated operations, a person skilled in the art would appreciate that a combination of operations from any number of different examples is also within scope of the aspects of the disclosure.

Example Operating Environment

Figure 10:
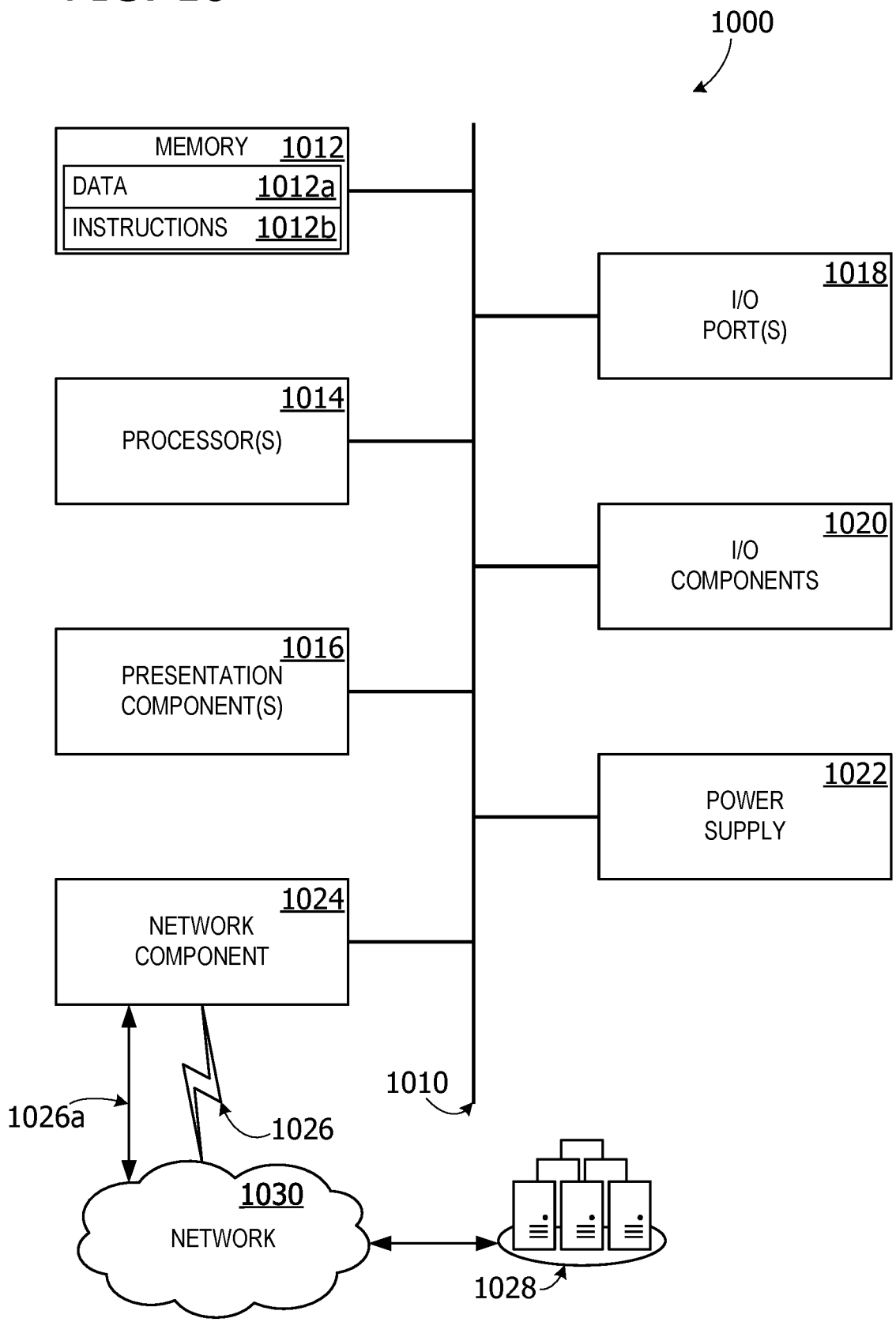
FIG. 10 is exemplary block diagram illustrating an example computing environment suitable for implementing some of the various examples disclosed herein.

FIG. 10 is a block diagram of an example computing device 1000 for implementing aspects disclosed herein and is designated generally as computing device 1000. Computing device 1000 is an example of a suitable computing environment and is not intended to suggest any limitation as to the scope of use or functionality of the examples disclosed herein. Neither should computing device 1000 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device.

Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1000 includes a bus 1010 that directly or indirectly couples the following devices: computer-storage memory 1012, one or more processors 1014, one or more presentation components 1016, I/O ports 1018, I/O components 1020, a power supply 1022, and a network component 1024. While computing device 1000 is depicted as a seemingly single device, multiple computing devices 1000 may work together and share the depicted device resources. For example, memory 1012 may be distributed across multiple devices, and processor(s) 1014 may be housed with different devices.

Bus 1010 represents what may be one or more busses (such as an address bus, data bus, or a combination thereof). Although the various blocks of FIG. 10 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 10 and the references herein to a "computing device." Memory 1012 may take the form of the computer-storage media references below and operatively provide storage of computer-readable instructions, data structures, program modules and other data for computing device 1000. In some examples, memory 1012 stores one or more of an operating system, a universal application platform, or other program modules and program data. Memory 1012 is thus able to store and access data 1012*a* and instructions 1012*b* that are executable by processor 1014 and configured to carry out the various operations disclosed herein.

In some examples, memory 1012 includes computer-storage media in the form of volatile and/or nonvolatile memory, removable or non-removable memory, data disks in virtual environments, or a combination thereof. Memory 1012 may include any quantity of memory associated with or accessible by computing device 1000. Memory 1012 may be internal to computing device 1000 (as shown in FIG. 10), external to computing device 1000 (not shown), or both (not shown). Examples of memory 1012 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1000. Additionally, or alternatively, memory 1012 may be distributed across multiple computing devices 1000, for example, in a virtualized environment in which instruction processing is carried out on multiple computing devices 1000. For the purposes of this disclosure, "computer storage media," "computer-storage memory," "memory," and "memory devices" are synonymous terms for computer-storage memory 1012, and none of these terms include carrier waves or propagating signaling.

Processor(s) 1014 may include any quantity of processing units that read data from various entities, such as memory 1012 or I/O components 1020 and may include CPUs and/or GPUs. Specifically, processor(s) 1014 are programmed to execute computer-executable instructions for implementing aspects of the disclosure. The instructions may be performed by the processor, by multiple processors within computing device 1000, or by a processor external to client computing device 1000. In some examples, processor(s) 1014 are programmed to execute instructions such as those illustrated in the in the accompanying drawings. Moreover, in some examples, processor(s) 1014 represent an implementation of analog techniques to perform the operations described herein. For example, the operations may be performed by an analog client computing device 1000 and/or a digital client computing device 1000. Presentation component(s) 1016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1000, across a wired connection, or in other ways. I/O ports 1018 allow computing device 1000 to be logically coupled to other devices including I/O components 1020, some of which may be built in. Example I/O components 1020 include, for example but without limitation, a microphone, joystick, game pad, satellite dish, scanner, printer, wireless device, etc.

Computing device 1000 may operate in a networked environment via network component 1024 using logical connections to one or more remote computers. In some examples, network component 1024 includes a network interface card and/or computer-executable instructions (e.g., a driver) for operating the network interface card. Communication between computing device 1000 and other devices may occur using any protocol or mechanism over any wired or wireless connection. In some examples, network component 1024 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1024 communicates over wireless communication link 1026 and/or a wired communication link 1026*a* to a cloud resource 1028 across network 1030. Various different examples of communication links 1026 and 1026*a* include a wireless connection, a wired connection, and/or a dedicated link, and in some examples, at least a portion is routed through the internet.

Although described in connection with an example computing device 1000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se.

Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for attentive sentence similarity scoring, the system comprising:
a computer-readable medium storing instructions that are operative upon execution by a processor to:
precompute a plurality of candidate sentences using a trained distilled sentence embedding (DSE) language model, wherein the trained DSE language model generates a plurality of candidate sentence representations based on the plurality of candidate sentences;
receive an input query including a selected sentence;
generate a set of similarity scores for each candidate sentence in the plurality of candidate sentences and the selected sentence by comparing a representation of the selected sentence to each candidate sentence representation in the plurality of candidate sentence representations, wherein the trained DSE language model is trained using training pairs of sentences and a set of teacher similarity scores obtained from a transformer language model, and wherein the trained DSE language model is trained to approximate the set of teacher similarity scores for the training pairs of sentences using a low-cost similarity function;
select a set of similar sentences from the plurality of candidate sentences based on the set of similarity scores; and
generate a response to the input query comprising the set of similar sentences.

2. The system of claim 1, wherein the trained DSE language model is trained by decoupling the transformer language model to perform sentence similarity comparisons using knowledge distillation.

3. The system of claim 1, further comprising:
another representation of a selected candidate sentence, wherein a comparison function is performed on the representation of the selected sentence and the other representation of the selected candidate sentence to generate a similarity score for the selected candidate sentence and the selected sentence.

4. The system of claim 1, further comprising:
a user interface device, wherein the response including the set of similar sentences is output via the user interface device.

5. The system of claim 1, wherein the trained DSE language model is trained by comparing test similarity scores with training similarity scores, the test similarity scores ranking a test sentence paired with each candidate sentence in the plurality of candidate sentences, the training similarity scores generated by a trained teacher model.

6. The system of claim 1, wherein the trained DSE language model maps the selected sentence to a set of vectors in latent space to generate the representation of the selected sentence.

7. The system of claim 1, further comprising:
sentence embeddings calculated for the plurality of candidate sentences by the trained DSE language model.

8. A method of attentive sentence similarity scoring, the method comprising:
receiving an input query including a selected sentence;
generating a set of similarity scores for each candidate sentence in a plurality of candidate sentences and the selected sentence by comparing a representation of the selected sentence and another representation of each candidate sentence in the plurality of candidate sentences using a trained distilled sentence embedding (DSE) language model, wherein the trained DSE language model generates a plurality of candidate sentence representations based on the plurality of candidate sentences, the set of similarity scores comprising at least one similarity score for each candidate sentence compared with the selected sentence, wherein the trained DSE language model is trained using training pairs of sentences and a set of teacher similarity scores obtained from a transformer language model, and wherein the trained DSE language model is trained to approximate the set of teacher similarity scores for the training pairs of sentences using a low-cost similarity function;
selecting a set of similar sentences from the plurality of candidate sentences based on the set of similarity scores; and
generating a response to the input query comprising the set of similar sentences.

9. The method of claim 8, further comprising:
training the DSE language model by decoupling the transformer language model to perform sentence similarity comparisons using knowledge distillation.

10. The method of claim 8, further comprising:
performing a comparison function on the representation of the selected sentence and another representation of a selected candidate sentence to generate a similarity score for the selected candidate sentence and the selected sentence.

11. The method of claim 8, further comprising:
outputting the generated response, including the set of similar sentences, via a user interface device.

12. The method of claim 8, wherein similarity scores ranking a test sentence paired with each candidate sentence in the plurality of candidate sentences are generated by the trained DSE language model, the similarity scores generated by the trained DSE language model are compared with training similarity scores generated by a trained teacher model to determine whether to continue training the trained DSE language model.

13. The method of claim 8, further comprising:
mapping the selected sentence to a set of vectors in latent space to generate the representation of the selected sentence for comparison with the plurality of candidate sentence representations.

14. The method of claim 8, further comprising:
calculating sentence embeddings for the plurality of candidate sentences.

15. One or more computer storage devices having computer-executable instructions stored thereon for attentive sentence similarity scoring, which, on execution by a computer, cause the computer to perform operations comprising:
receiving an input query including a selected sentence;
comparing a representation of the selected sentence with a plurality of candidate sentence representations representing each candidate sentence in a plurality of candidate sentences;
generating, using a trained distilled sentence embedding (DSE) language model, a set of similarity scores for each candidate sentence in the plurality of candidate sentences and the selected sentence based on comparison of the plurality of candidate sentence representations and the representation of the selected sentence, each similarity score in the set of similarity scores associated with the comparison of the representation of the selected sentence with the plurality of candidate sentence representations of each candidate sentence in the plurality of candidate sentences, wherein the trained DSE language model is trained using training pairs of sentences and a set of teacher similarity scores obtained from a transformer language model, wherein the trained DSE language model generates the plurality of candidate sentence representations based on the plurality of candidate sentences, and wherein the trained DSE language model is trained to approximate the set of teacher similarity scores for the training pairs of sentences using a low-cost similarity function;
selecting a set of similar sentences from the plurality of candidate sentences based on the set of similarity scores; and
generating a response to the input query, the response comprising the set of similar sentences.

16. The one or more computer storage devices of claim 15, wherein the distilled sentence embedding (DSE) language model is trained by decoupling the transformer language model to perform sentence similarity comparisons using knowledge distillation, wherein the trained DSE language model calculates sentence embeddings for the plurality of candidate sentences.

17. The one or more computer storage devices of claim 15, wherein the operations further comprise:
performing a comparison function on representations associated with the selected sentence and a candidate sentence pair to generate a similarity score for the selected sentence and the candidate sentence pair.

18. The one or more computer storage devices of claim 15, wherein the operations further comprise:

outputting the response, including the set of similar sentences, to at least one user interface device.

19. The one or more computer storage devices of claim 15, wherein the operations further comprise:
training the DSE language model using at least one test sentence, wherein similarity scores ranking a test sentence paired with each candidate sentence in the plurality of candidate sentences generated by the DSE language model are compared with training similarity scores generated by a trained teacher model to determine whether to continue training the DSE language model.

20. The one or more computer storage devices of claim 15, wherein the operations further comprise:
mapping the selected sentence to a set of vectors in latent space to generate the representation of the selected sentence for the comparison with the plurality of candidate sentence representations.

* * * * *